United States Patent [19]
Takahashi

[11] Patent Number: 6,147,858
[45] Date of Patent: Nov. 14, 2000

[54] KEYBOARD UNIT AND PORTABLE TYPE INFORMATION APPARATUS HAVING THE SAME

[75] Inventor: Kimiyo Takahashi, Iiyama, Japan

[73] Assignee: Fujitsu Takamisawa Components Company, Tokyo, Japan

[21] Appl. No.: 09/243,683

[22] Filed: Feb. 3, 1999

[30] Foreign Application Priority Data

Mar. 31, 1998 [JP] Japan ................................. 10-086121

[51] Int. Cl.[7] ............................. G06F 3/023; H05K 5/02
[52] U.S. Cl. ......................... 361/680; 361/683; 361/681; 361/682; 341/22; 312/208.4; 345/168; 364/709.12
[58] Field of Search ................................... 361/680, 683, 361/686, 724–727, 681, 682; 400/492, 472, 473, 477, 479, 488, 489; 341/21, 22; 312/208.1, 208.4; D14/115, 247; D18/1, 7, 52; 345/168, 169; 364/708.1, 709.12

[56] References Cited

U.S. PATENT DOCUMENTS

| | | | |
|---|---|---|---|
| D. 308,194 | 5/1990 | Messerschmidt et al. | D14/106 |
| 4,107,784 | 8/1978 | Van Bemmelen | 364/900 |
| 4,698,782 | 10/1987 | Ng et al. | 364/708 |
| 4,704,604 | 11/1987 | Fuhs | 340/700 |
| 4,903,221 | 2/1990 | Krenz | 364/708 |
| 5,175,672 | 12/1992 | Conner et al. | 361/393 |
| 5,247,285 | 9/1993 | Yokota et al. | 345/169 |
| 5,375,076 | 12/1994 | Goodrich et al. | 364/708.1 |
| 5,490,036 | 2/1996 | Lin et al. | 361/680 |
| 5,539,615 | 7/1996 | Sellers | 361/680 |
| 5,557,562 | 9/1996 | Yoshiharu et al. | 364/708.1 |
| 5,745,056 | 4/1998 | Takahashi et al. | |
| 5,764,474 | 6/1998 | Youens | 361/680 |

FOREIGN PATENT DOCUMENTS

| | | | |
|---|---|---|---|
| 356059344A | 5/1981 | Japan | G06F 3/023 |
| 363269213A | 11/1988 | Japan | G06F 1/00 |

*Primary Examiner*—Leo P. Picard
*Assistant Examiner*—Anatoly Vortman
*Attorney, Agent, or Firm*—Staas & Halsey LLP

[57] ABSTRACT

A keyboard to which the portable type information apparatus, such as an electronic notebook, a pen computer or a portable digital assistants/terminal equipment, can be directly and detachably connected and by which a large quantity of information can be quickly inputted. The keyboard is provided with a connector, to which a portable type information apparatus is directly and detachably connected, and a plurality of keys through which the apparatus can be operated. The keys are arranged in the keyboard main body, and the connector is arranged in the keyboard movable section. The keyboard movable section is connected to the keyboard main body while an angle formed between the keyboard movable section and the keyboard main body can be arbitrarily changed and the angular position can be held by itself. The keyboard is provided with an engaging section by which the keyboard is mechanically engaged and fixed to the information apparatus. The engaging section is provided with a member for generating a click when connection is conducted by the connector. The keyboard main body is provided with an additional base capable of being housed.

18 Claims, 10 Drawing Sheets

6,147,858

KEYBOARD UNIT AND PORTABLE TYPE INFORMATION APPARATUS HAVING THE SAME

BACKGROUND OF THE INVENTION

1. Field of the Invention

The present invention relates to a keyboard unit and a portable type information apparatus having the keyboard unit.

2. Description of the Related Art

A portable type information apparatus, such as an electronic notebook, a pen computer or a portable digital assistants/terminal equipment, is usually provided with an input device such as a pen or a micro-keyboard.

However, when information is inputted by the pen as described above, it is difficult to input a large quantity of information quickly. Even when information is inputted by the micro-keyboard as described above, the same problems may be caused.

SUMMARY OF THE INVENTION

The present invention has been accomplished to solve the above problems. It is an object of the present invention to provide a keyboard by which a large quantity of information can be quickly inputted and also provide a portable type information apparatus having the keyboard.

In order to solve the above problems, the keyboard unit of the present invention comprises: a connector with which a portable type information apparatus can be directly and detachably connected; and a plurality of keys capable of operating the portable type information apparatus. Preferably, the keys are arranged in a main body of the keyboard, the connector is arranged in a movable section of the keyboard, and the movable section of the keyboard is pivotally connected with the main body of the keyboard, and an angle between the movable section and the main body of the keyboard can be changed and its angular position can be held by itself. Preferably, the keyboard includes an engaging section by which the keyboard is stationarily attached to the portable type information apparatus by the mechanical engagement of the keyboard with the portable type information apparatus when the portable type information apparatus is connected with the keyboard by the connector. Preferably, the engaging section includes a member by which a click is generated when the portable type information apparatus is connected with the keyboard by the connector. Preferably, the main body of the keyboard includes an additional base capable of being housed.

The portable type information apparatus of the present invention comprises a keyboard, wherein the keyboard includes a connector with which a portable type information apparatus can be directly and detachably connected and also includes a plurality of keys capable of operating the portable type information apparatus. Preferably, the keys are arranged in a main body of the keyboard, the connector is arranged in a movable section of the keyboard, and the movable section of the keyboard is pivotally connected with the main body of the keyboard, and an angle between the movable section and the main body of the keyboard can be changed and its angular position can be held by itself. Preferably, the portable type information apparatus includes an engaging section by which the keyboard is stationarily attached to the portable type information apparatus by the mechanical engagement of the keyboard with the portable type information apparatus when the portable type information apparatus is connected with the keyboard by the connector. Preferably, the engaging section includes a member by which a click is generated when the portable type information apparatus is connected with the keyboard by the connector. Preferably, the main body of the keyboard includes an additional base capable of being housed.

BRIEF DESCRIPTION OF THE DRAWINGS

These and other objects of the present invention will become apparent from the following detailed description of the preferred embodiment of the invention, taken in connection with the accompanying drawings.

In the drawings.

DETAILED DESCRIPTION OF THE INVENTION

Figure 1:
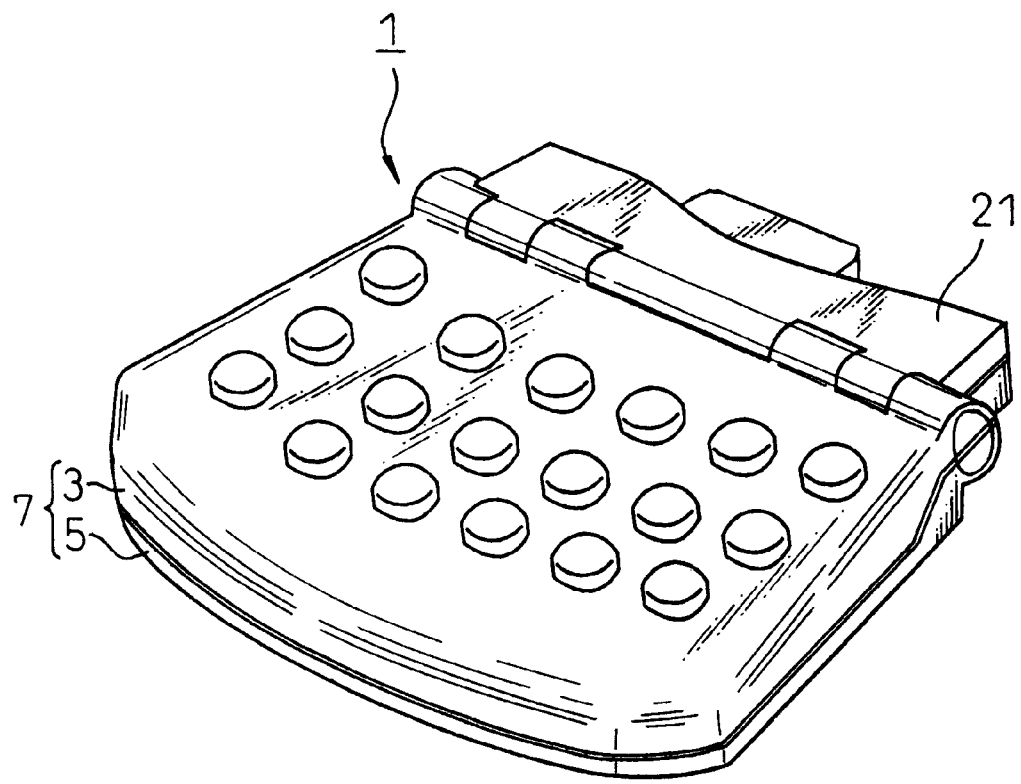
FIG. 1 is a perspective view showing a keyboard unit of an embodiment of the present invention operated by one hand.

Referring to the drawings, an embodiment of the present invention will be explained below.

Figure 2:
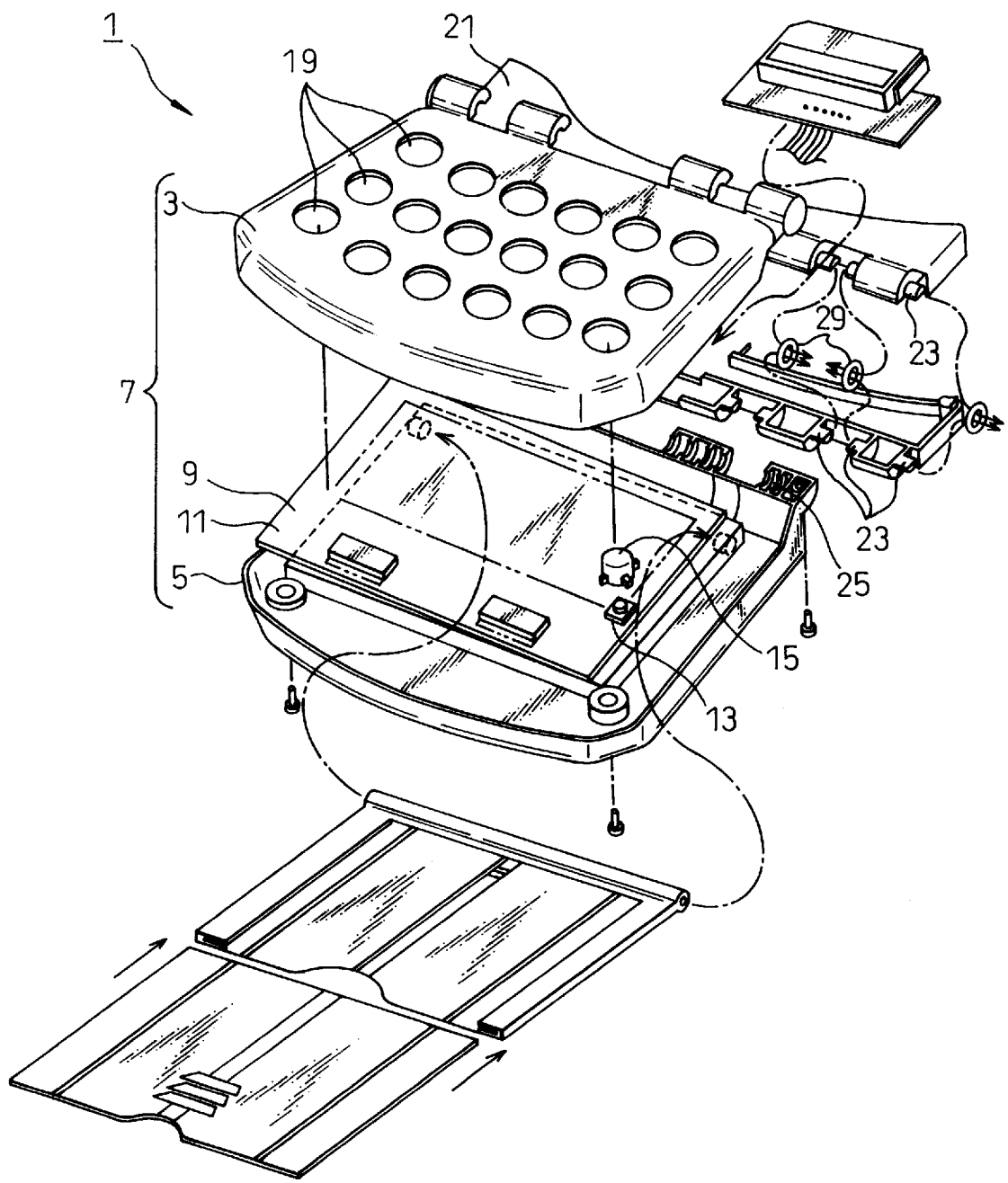
FIG. 2 is an exploded perspective view of the keyboard unit.
Figure 3:
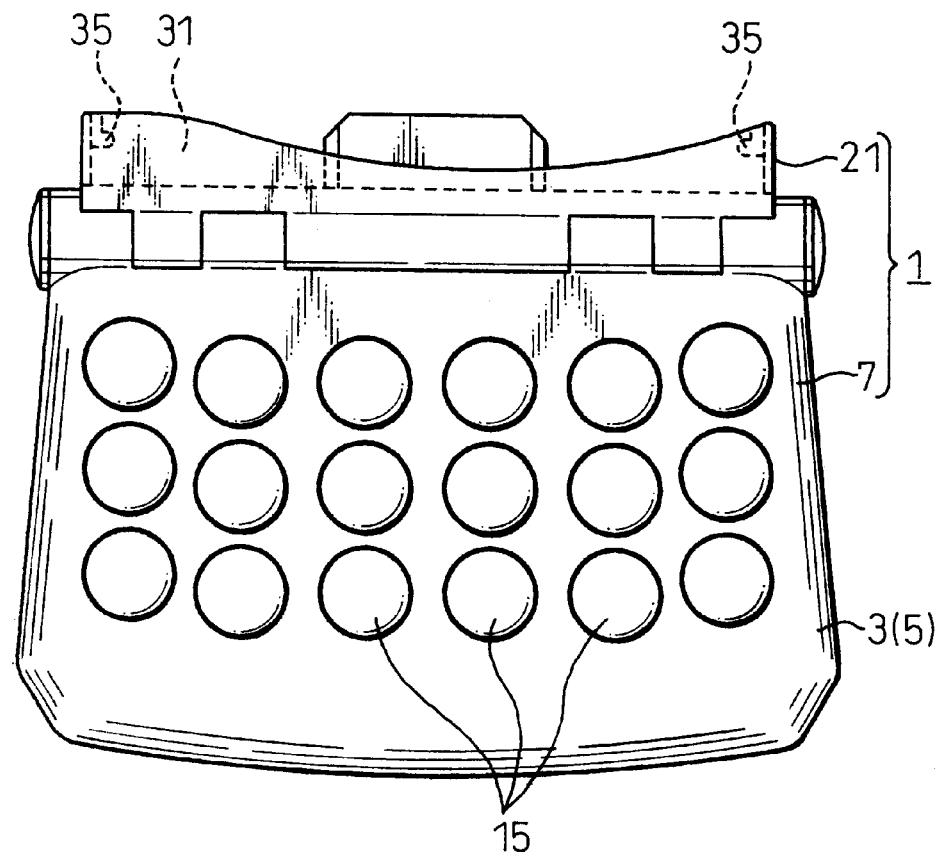
FIG. 3 is a plan view of the keyboard unit.
Figure 4:
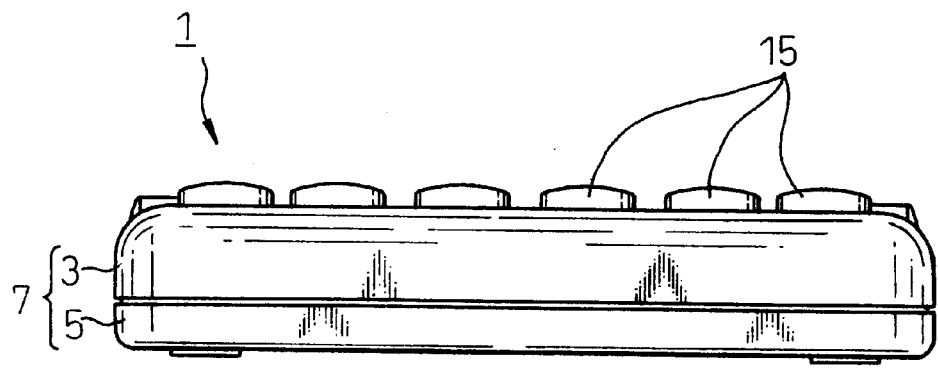
FIG. 4 is a front view of the keyboard unit.
Figure 5:
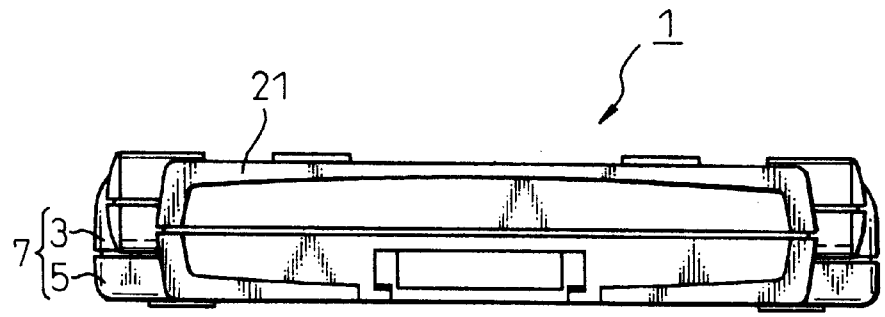
FIG. 5 is a rear view of the keyboard unit.
Figure 6:
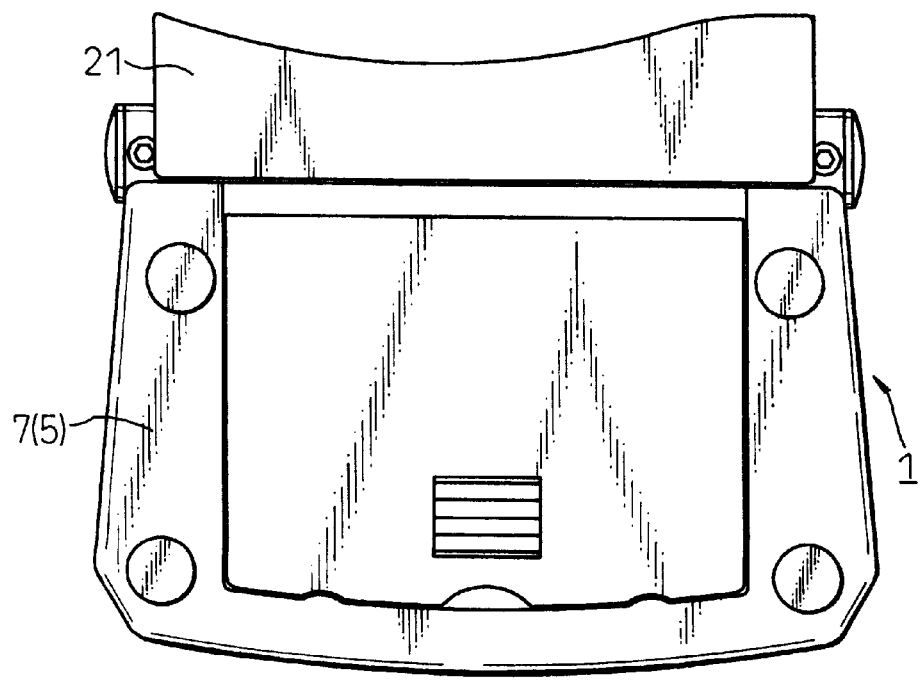
FIG. 6 is a bottom view of the keyboard unit.
Figure 7:
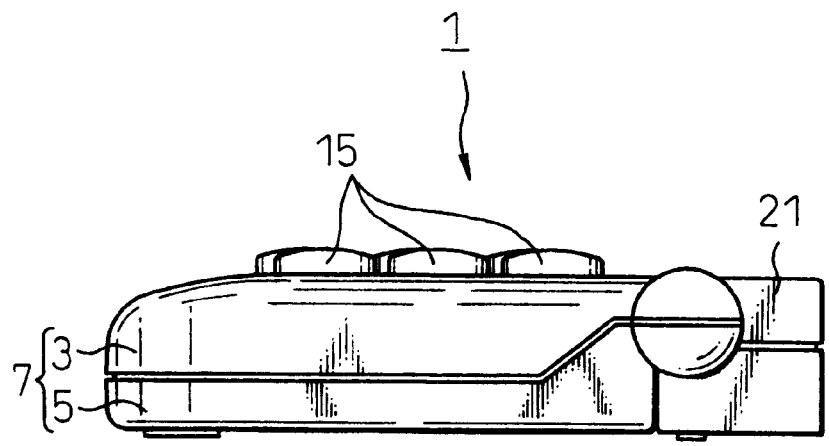
FIG. 7 is a right side view of the keyboard unit.
Figure 8:
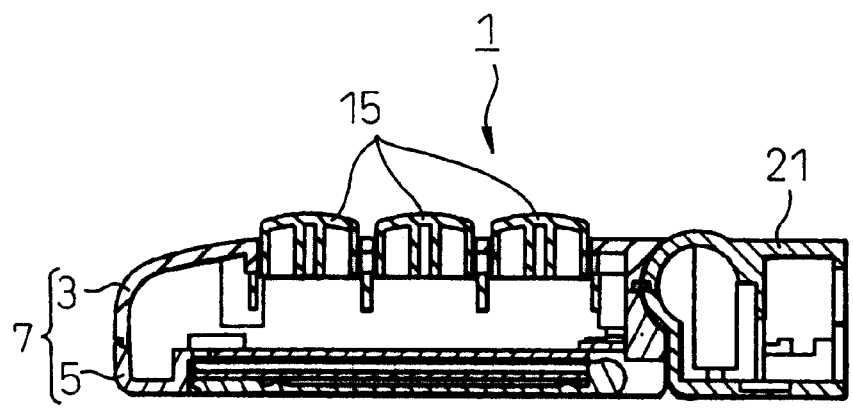
FIG. 8 is a right side cross-sectional view of the keyboard unit.

FIG. 1 is a perspective view showing a keyboard unit of an embodiment of the present invention operated by one hand. FIG. 2 is an exploded perspective view of the keyboard unit. FIG. 3 is a plan view of the keyboard unit. FIG. 4 is a front view of the keyboard unit. FIG. 5 is a rear view of the keyboard unit. FIG. 6 is a bottom view of the keyboard unit. FIG. 7 is a right side view of the keyboard unit. FIG. 8 is a right side cross-sectional view of the keyboard unit.

The keyboard unit 1 shown in the drawing includes a keyboard main body 7 composed of an upper case 3 and a lower case 5. A switch unit 9 is incorporated into the keyboard main body 7.

The switch unit 9 includes: a printed board 11 on which a predetermined electronic circuit is provided; and a plurality of switch elements 13, for example, eighteen switch elements 13 which are mounted on the printed board 11, wherein only one switch element is shown in the drawing.

On each switch element 13, there is provided a key top 15 corresponding to the switch element 13. The switch element 13 and key top 15 corresponding to the switch element 13 compose a button switch.

On the operational surface of the upper case 3, circular holes 19 are formed at the portions corresponding to the switch elements 13 (key tops 15). The key tops 15 are partially protruded upward from these eighteen openings 19.

Figure 9:
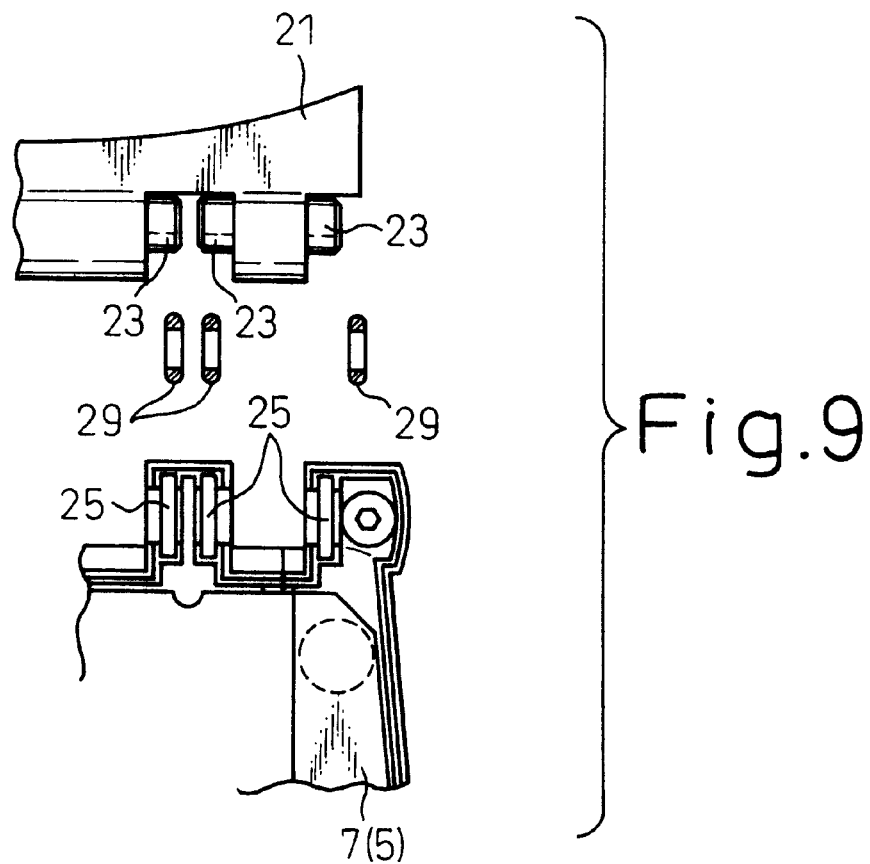
FIG. 9 is an exploded view of primary portions of the keyboard main body and the keyboard movable section.

A keyboard movable section 21 is pivotally connected onto the back side of the keyboard main body 7. In the case of connection, a plurality of shafts 23 of the keyboard movable section 21 are set into corresponding recesses 25 of the keyboard main body 7 (the upper case 3 and the lower case 5). An O-ring 29 is attached to each shaft 23. This O-ring 29 is subjected to frictional engagement with the corresponding shaft 23 and recess 25 as shown in FIGS. 2 and 9.

Figure 10:
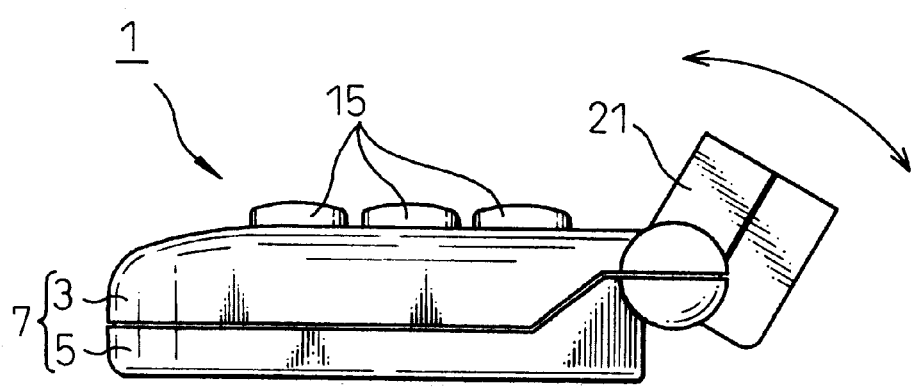
FIG. 10 is a view showing a state in which an angular position of the keyboard movable section is changed.

Due to the above arrangement of frictional engagement, when an operator (not shown) of the keyboard unit 1 changes an angular position of the keyboard movable section 21 with respect to the keyboard main body 7, the angular position of the keyboard movable section 21 can be held by itself as it is (shown in FIG. 10).

Figure 11:
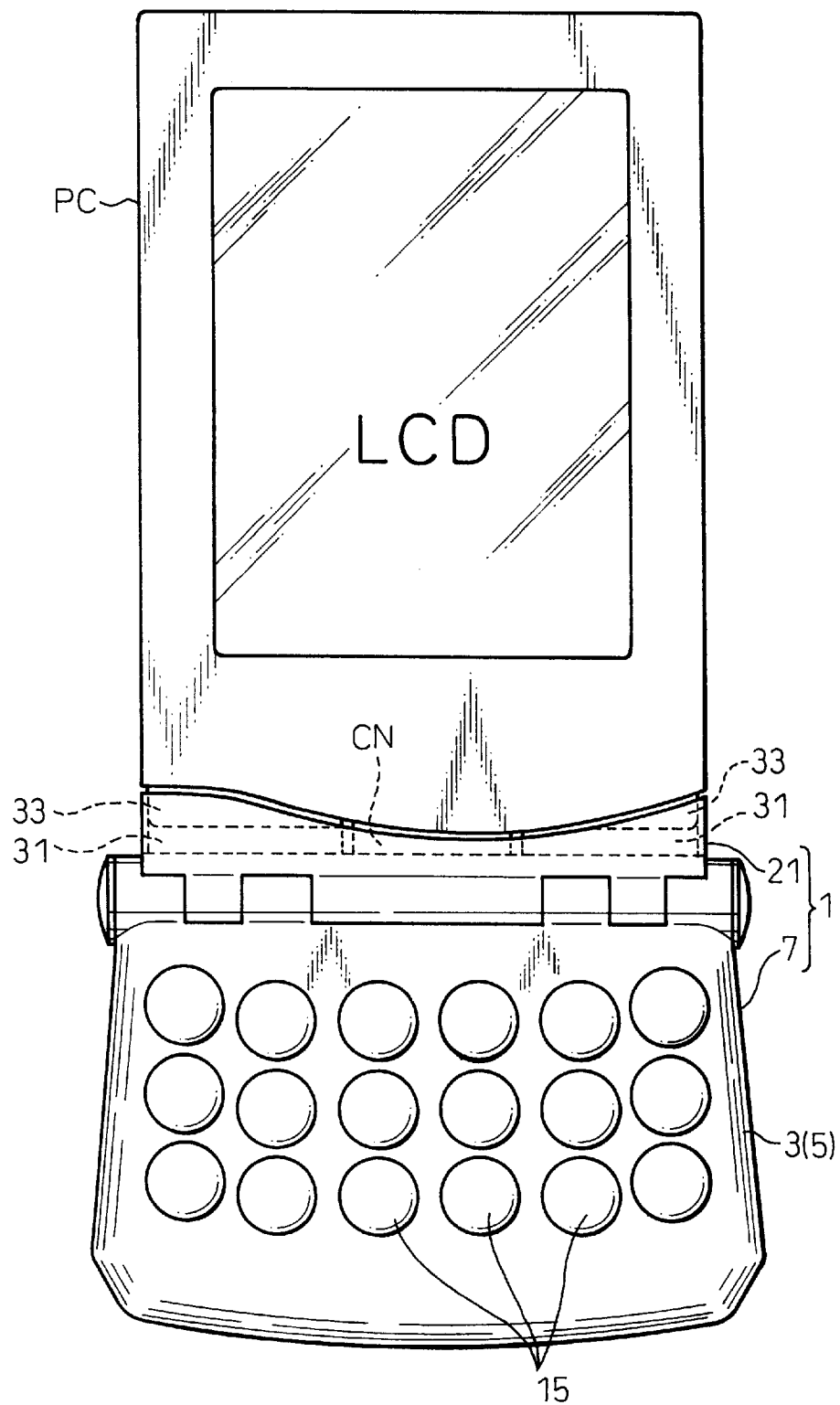
FIG. 11 is a plan view showing a state in which the portable type information apparatus and the keyboard unit are integrated into one body.

FIG. 11 is a plan view of a pen computer PC, which is an example of the portable type information apparatus, to which the keyboard unit 1 of this example is directly connected by means of a connector, that is, the keyboard unit 1 of this example is connected without using cables.

On the back of the keyboard unit 1, at the substantial center of the keyboard movable section 21, there is provided a receptacle type connector CN for the electrical connection with the pen computer PC.

This connector CN of the keyboard movable section 21 is connected to a plug type connector (not shown) of the pen computer PC.

In order to prevent both connectors from being given an excessively strong force in the case of connection, both side portions 33 of the pen computer PC enter the recesses 31 of the keyboard movable section 21, so that the keyboard movable section 21 and the pen computer PC can be mechanically fixed to each other.

In order to generate a click so that an operator (not shown) can realize that the connection to the pen computer PC has been completed, there are provided claws 35, which can be elastically engaged with recesses (not shown) formed on the side of the pen computer PC, at predetermined positions in the recesses 31 of the keyboard movable section 21 (shown in FIG. 3).

In this connection, when the keyboard main body 7, of which the keyboard movable section 21 is connected with the pen computer PC (or an outside device) by the connector CN, is put on a desk and the LCD of the pen computer PC is inclined to an angular position at which an operator can easily see the display, it is possible for the operator to gain access to the pen computer PC, that is, it is possible for the operator to operate the pen computer PC through the push button switches (top keys 15) of the keyboard main body 7.

Figure 12:
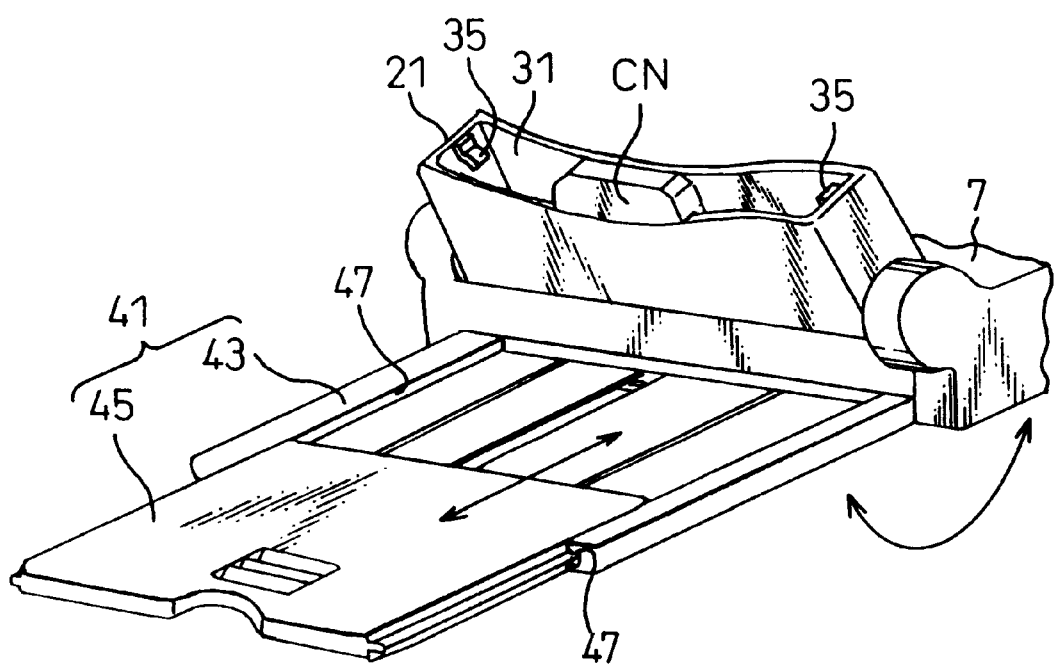
FIG. 12 is a perspective view of the keyboard unit, the additional base of which is developed, wherein the view is taken from the back.
Figure 13:
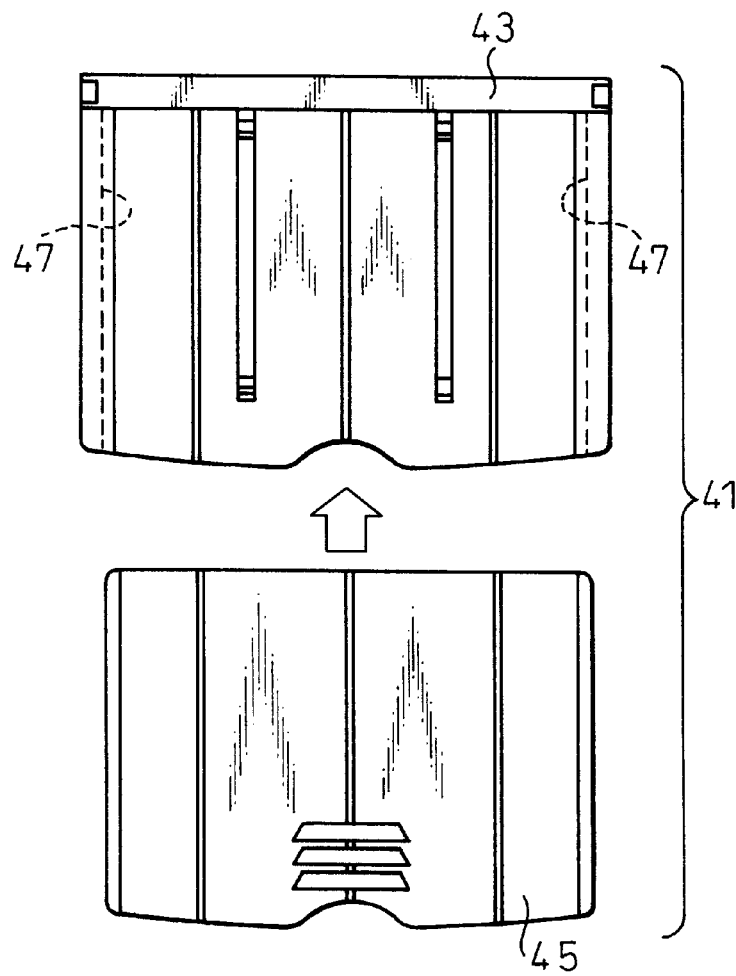
FIG. 13 is an exploded plan view of the additional base.

In this case, there is a possibility that the entire apparatus is inclined by the weight of the pen computer PC. In order to solve the above problem, an additional base 41 capable of being housed is arranged in the keyboard 7 as shown in FIG. 12. Specifically, a rotary type additional base 41 is attached onto the lower surface of the keyboard 7. This additional base 41 includes a first member 43 and a second member 45 slidably housed in the first member 43 (shown in FIG. 13).

Figure 14:
FIG. 14 is a cross-sectional side view of the first member.
Figure 15:
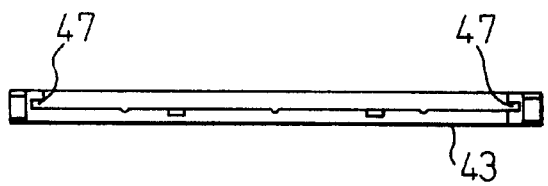
FIG. 15 is a front view of the first member.

One end of the first member 43 is pivotally connected to the bottom portion of the keyboard main body 7, and guide grooves 47 are formed on both sides of the first member 43 (shown in FIGS. 14 and 15).

The second member 45 is slidably guided by the guide grooves 47 formed on both sides of the first member 43, and a predetermined length of the second member 45 can be protruded outside.

When the additional base is not used, it is housed and fixed in the recess formed on the bottom surface of the keyboard main body 7.

Figure 16:
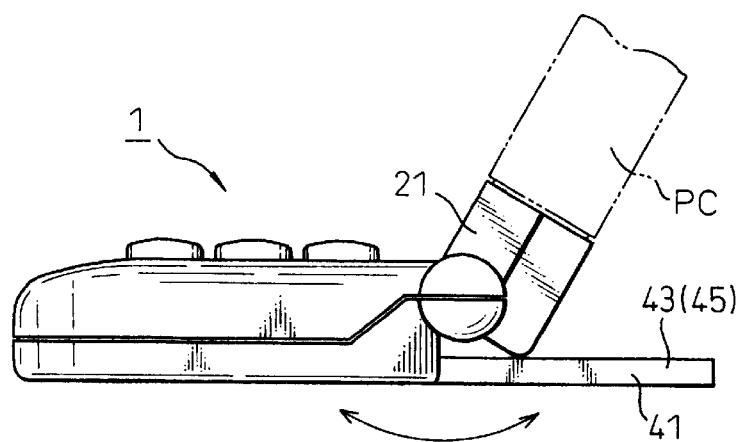
FIG. 16 is a side view of the keyboard unit, the additional base of which is developed.
Figure 17:
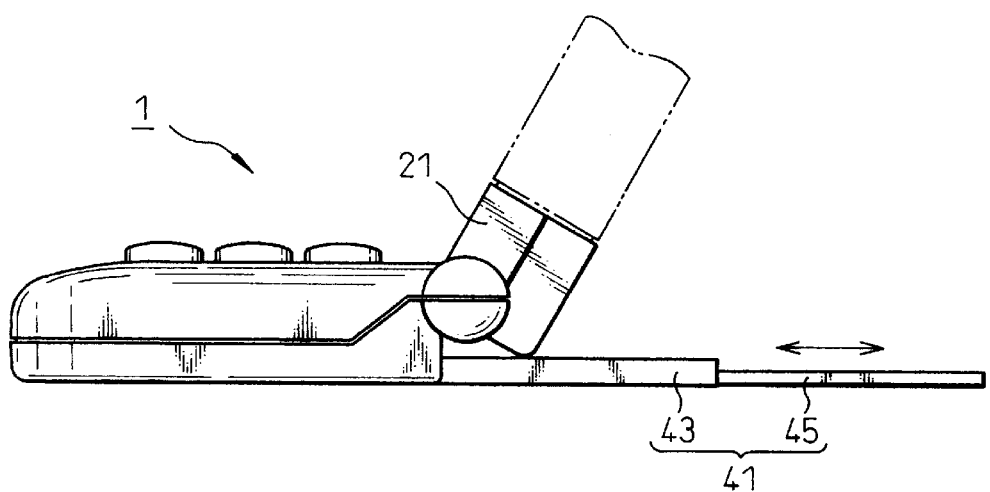
FIG. 17 is a side view of the keyboard unit, from the additional base of which the second member is drawn out.

On the other hand, when the additional base 41 (the first member 43 and the second member 45) is required, it is developed (rotated) backward with respect to the keyboard main body 7 at an angle of 180° around one end of the additional base 41 pivotally attached to the bottom portion of the keyboard main body 7 as shown in FIG. 16. In order to further enhance the stability, if necessary, it is possible to draw out the second member 45 as shown in FIG. 17 (also shown in FIG. 12).

As explained above, according to the keyboard unit 1 of this embodiment, the portable type information apparatus and the keyboard unit 1 can be directly connected and integrated to each other by means of connector connection without using cables. Therefore, it is possible for an operator to hold the entire apparatus by one hand and operate the keys. Accordingly, the keyboard unit 1 of this embodiment is suitable for practical use.

The display of the portable type information apparatus, which has been connected to the keyboard unit 1 by means of connector connection, can be set and held at an arbitrary angular position. Therefore, the visibility is remarkably enhanced and the apparatus becomes very handy.

When this apparatus is set on a desk and operated, the keyboard unit and the device connected to it can be stably supported by using the additional base 41. Therefore, it is possible for this apparatus to provide the same operability as that of the stationary type apparatus.

Since the means of connector connection is adopted, it is simple to change from the pen input to the key input conducted by the keyboard unit 1. Accordingly, the input efficiency and the operability can be remarkably enhanced.

In this embodiment, it is estimated that input operation is conducted on the keyboard unit 1 by one hand. However, it is possible to apply the invention to a large keyboard unit on which input operation is conducted using both hands.

As described above, according to the present invention, although the structure is simple, it is possible to input a large quantity of information quickly on a portable type information apparatus, and the operability can be remarkably enhanced.

It is to be understood that the invention is by no means limited to the specific embodiments illustrated and described herein, and that various modifications thereto, which come within the scope of the present invention as defined in the appended claims, may be made.

What is claimed is:

1. A keyboard unit for a portable type information apparatus, comprising:
   a main body;
   a movable section pivotally connected with said main body to permit an angle between said movable section and said main body to be changed, said movable section being provided for detachably engaging and supporting the portable type information apparatus;

a electrical connector arranged in said movable section for detachably electrically connecting to the portable type information apparatus, said movable section mechanically supporting the electrical connection; and a plurality of key switches arranged in said main body for an operation of the portable type information apparatus through said electrical connector.

2. The keyboard unit according to claim 1, wherein said movable section is pivotally connected with said main body through a frictional engagement which holds said movable section at a desired angular position.

3. The keyboard unit according to claim 1, wherein said movable section includes a recess for fixedly receiving a part of the portable information apparatus, said electrical connector being arranged adjacent to said recess.

4. The keyboard unit according to claim 1, wherein said movable section includes an engaging section for mechanically engaging said movable section with the portable type information apparatus, said engaging section generating a click sound when the portable type information apparatus is attached to the keyboard unit through said movable section and is connected through said electrical connector.

5. The keyboard unit according to claim 1, further comprising an additional base shiftably arranged in said main body to provide a stability for the keyboard unit against a weight of the portable type information apparatus when the portable type information apparatus is attached to the keyboard unit through said movable section and is connected through said electrical connector.

6. A keyboard operated portable type information apparatus, comprising:

a portable type information apparatus; and a keyboard unit, comprising:

a main body;

a movable section pivotally connected with said main body to permit an angle between said movable section and said main body to be changed, said movable section detachably engaging and supporting the portable type information apparatus;

an electrical connector arranged in said movable section which detachably connects with the portable type information apparatus, said movable section mechanically supporting the electrical connection; and a plurality of key switches arranged in said main body for an operation of the portable type information apparatus through said electrical connector.

7. The portable type information apparatus according to claim 6, wherein said movable section is pivotally connected with said main body through a frictional engagement which holds said movable section at a desired angular position.

8. The portable type information apparatus according to claim 6, wherein said movable section includes a recess for fixedly receiving a part of the portable information apparatus, said electrical connector being arranged adjacent to said recess.

9. The portable type information apparatus according to claim 6, wherein said movable section includes an engaging section for mechanically engaging said movable section with the portable type information apparatus, said engaging section generating a click sound when the portable type information apparatus is attached to the keyboard unit through said movable section and is connected through said electrical connector.

10. The portable type information apparatus according to claim 6, wherein the keyboard further comprising an additional base shiftably arranged in said main body to provide a stability for the keyboard unit against a weight of the portable type information apparatus when the portable type information apparatus is attached to the keyboard unit through said movable section and is connected through said electrical connector.

11. A keyboard unit for a portable information apparatus having an apparatus connector adapted to receive external inputs, the keyboard unit comprising:

a main body;

a plurality of keys disposed in said main body and forming a keyboard;

a movable section pivotally connected with the main body in a frictional engagement, said movable section having a recess for mechanically detachably engaging and supporting the information processing apparatus;

a keyboard connector in electrical communication with said keys, said keyboard connector disposed in said recess, said keyboard connector engaging said apparatus connector simultaneously with the engaging and supporting of the information processing apparatus.

12. A keyboard unit as claimed in claim 11 further comprising a pair of claws disposed in said recess, each said claw engaging an edge of said portable information apparatus when said portable information apparatus is received in said recess.

13. A keyboard unit for a portable information apparatus adapted to receive external inputs, the keyboard unit comprising:

an upper case having a first plurality of protrusions disposed along an edge of said upper case, each of said first plurality of protrusions having a respective recess;

a lower case assembled together with said upper case, said lower case having a second plurality of protrusions disposed along an edge of said lower case, each of said second plurality of protrusions having a respective recess, each said recess in each said second plurality of protrusions aligning with a respective said recess of said first plurality of protrusions forming a plurality of cavities;

a plurality of frictional elements disposed in said cavities;

a plurality of keys adapted to form a keyboard, said keyboard disposed between said upper and lower housings and adapted to provide inputs to the portable information processing apparatus; and a movable section pivotally connected with said frictional elements, said movable section having a recess for detachably receiving and supporting the information processing apparatus, said keyboard communicating with said information processing apparatus when said information processing apparatus is received in said recess.

14. A keyboard unit as claimed in claim 13, wherein said lower case has a further recess which receives a support member, said support member rotationally attached to said lower case such that in a first position, said support member is stored in the lower case and in a second position, said support member acts as a lever arm to counter a weight of the portable information processing apparatus when the portable information processing apparatus is received.

15. A keyboard unit as claimed in claim 14, further comprising an extension member, said extension member engaged with said support member and movable between a stored position and an extended position, so that when said support member is in the second position and said extended member is not in the stored position, the extension member increases an effective length of the lever arm.

16. A keyboard unit as claimed in claim 15, wherein the extension member is slidably engaged with the support member.

17. A keyboard unit as claimed in claim 15, wherein when said extension member is in the stored position, said extension member is within a profile of the support member.

18. A keyboard unit as claimed in claim 14, wherein when said support member is in the first position, said support member is within a profile of said lower case.

* * * * *

UNITED STATES PATENT AND TRADEMARK OFFICE
CERTIFICATE OF CORRECTION

PATENT NO.:   6,147,858
DATED     :   November 14, 2000
INVENTOR(S):  Kimiyo TAKAHASHI It is certified that error appears in the above-identified patent and that said Letters Patent is hereby corrected as shown below:

On the title page, [73] Assignee, change "Components Company" to --Component Limited--.

Signed and Sealed this

First Day of May, 2001

Attest:

NICHOLAS P. GODICI

*Attesting Officer*    *Acting Director of the United States Patent and Trademark Office*